United States Patent
Harata et al.

(10) Patent No.: US 9,038,132 B2
(45) Date of Patent: May 19, 2015

(54) BUS MONITORING SECURITY DEVICE AND BUS MONITORING SECURITY SYSTEM

(75) Inventors: Yuzo Harata, Chiryu (JP); Yasuyuki Takahashi, Okazaki (JP); Satoshi Suzuki, Nagoya (JP); Mitsuyoshi Natsume, Hekinan (JP); Tomohisa Kishigami, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/613,545

(22) Filed: Sep. 13, 2012

(65) Prior Publication Data

US 2013/0081106 A1 Mar. 28, 2013

(30) Foreign Application Priority Data

Sep. 28, 2011 (JP) ................................. 2011-212517

(51) Int. Cl.
*G06F 21/85* (2013.01)
*G06F 21/55* (2013.01)
(Continued)

(52) U.S. Cl.
CPC .............. *G06F 21/554* (2013.01); *H04L 12/40* (2013.01); *H04L 2012/40273* (2013.01); *H04L 43/0811* (2013.01); *G06F 21/85* (2013.01)

(58) Field of Classification Search
CPC ..... Y02T 10/47; Y02T 10/24; F01N 2610/11; F01N 3/208; G06F 8/65; G06F 21/6218; G06F 21/31; G06F 21/85; G06F 21/554; F02D 25/00; H04L 63/1416; H04L 63/1408; H04L 63/145; H04L 63/1441; H04L 63/1458; H04L 63/08; H04L 63/083; H04L 63/10; H04L 2012/40273; H04L 12/40; H04L 67/12; H04L 21/606; B60R 2021/01286; B60R 16/0231; B60R 16/023

USPC .............................................................. 726/2
See application file for complete search history.

(56) References Cited

U.S. PATENT DOCUMENTS 6,138,059 A * 10/2000 Ozeki et al. ........................ 701/1
6,957,136 B2 * 10/2005 Tachibana et al. .............. 701/36
(Continued)

FOREIGN PATENT DOCUMENTS

JP 2003-046536 2/2003
JP 2007-166302 6/2007
(Continued)

OTHER PUBLICATIONS

Office action dated Jul. 9, 2013 in corresponding Japanese Application No. 2011-212517.

*Primary Examiner* — Eleni Shiferaw
*Assistant Examiner* — Nelson Scott Giddins
(74) *Attorney, Agent, or Firm* — Harness, Dickey & Pierce, PLC (57) ABSTRACT

A bus monitoring security device is connected to a bus, which includes a tool side bus having a tool connection terminal and an ECU side bus. The ECU side bus is coupled with an ECU, and the tool side bus is coupled with a tool capable of communicating with the ECU via the tool connection terminal. The tool side bus and the ECU side bus are separately coupled with the bus monitoring security device. The bus monitoring security device includes: a controller for determining whether the tool being to access the ECU is connected to the ECU side bus, and for restricting transmission and reception of data between the tool and the ECU when the controller determines that the tool is connected to the ECU side bus.

9 Claims, 9 Drawing Sheets (51) Int. Cl.
*H04L 12/40* (2006.01)
*H04L 12/26* (2006.01)

(56) References Cited

U.S. PATENT DOCUMENTS

| | | | |
|---|---|---|---|
| 7,203,580 B2* | 4/2007 | Ban et al. | 701/29.1 |
| 8,069,257 B1* | 11/2011 | Bhatia et al. | 709/230 |
| 8,077,733 B2* | 12/2011 | Matsuo | 370/401 |
| 8,081,643 B2* | 12/2011 | Sonoda et al. | 370/401 |
| 8,290,660 B2* | 10/2012 | Lazarz et al. | 701/32.6 |
| 8,582,586 B2* | 11/2013 | Tsuboi et al. | 370/401 |
| 2001/0002814 A1* | 6/2001 | Suganuma et al. | 340/5.74 |
| 2003/0009271 A1* | 1/2003 | Akiyama | 701/33 |
| 2003/0041217 A1* | 2/2003 | Terada et al. | 711/154 |
| 2004/0029556 A1* | 2/2004 | Goto et al. | 455/404.1 |
| 2004/0242201 A1* | 12/2004 | Sasakura et al. | 455/411 |
| 2005/0187674 A1* | 8/2005 | Ando | 701/1 |
| 2006/0241784 A1* | 10/2006 | Fredriksson | 700/17 |
| 2006/0287784 A1* | 12/2006 | Kanki | 701/29 |
| 2007/0133578 A1 | 6/2007 | Tani | |
| 2007/0288623 A1* | 12/2007 | Kato et al. | 709/223 |
| 2009/0290485 A1* | 11/2009 | Zinke et al. | 370/221 |
| 2010/0002594 A1* | 1/2010 | Elend | 370/252 |
| 2010/0138493 A1* | 6/2010 | Natsume | 709/204 |
| 2010/0299023 A1* | 11/2010 | Okada | 701/35 |
| 2011/0047630 A1* | 2/2011 | Cheng et al. | 726/34 |
| 2011/0083161 A1* | 4/2011 | Ishida et al. | 726/2 |
| 2011/0143719 A1* | 6/2011 | Jung et al. | 455/412.1 |
| 2012/0030490 A1* | 2/2012 | Makino et al. | 713/323 |
| 2012/0140752 A1* | 6/2012 | Yun et al. | 370/338 |
| 2013/0073169 A1* | 3/2013 | Emberson et al. | 701/99 |
| 2013/0104231 A1* | 4/2013 | Niner et al. | 726/23 |
| 2013/0212571 A1* | 8/2013 | Matsuura et al. | 717/170 |
| 2013/0219170 A1* | 8/2013 | Naitou et al. | 713/153 |
| 2014/0343787 A1* | 11/2014 | Mabuchi | 701/31.7 |

FOREIGN PATENT DOCUMENTS

| | | |
|---|---|---|
| JP | 2008-079028 | 4/2008 |
| JP | 2009-225045 | 10/2009 |

* cited by examiner

BUS MONITORING SECURITY DEVICE AND BUS MONITORING SECURITY SYSTEM

CROSS REFERENCE TO RELATED APPLICATION

This application is based on Japanese Patent Application No. 2011-212517 filed on Sep. 28, 2011, the disclosure of which is incorporated herein by reference.

TECHNICAL FIELD

The present disclosure relates to a bus monitoring security device and a bus monitoring security system that monitor a data bus.

BACKGROUND

Hitherto, relay devices that transmit and receive (relay) data to and from a plurality of electronic control units (ECUs) connected to a bus have been used (see Patent Document 1, for example). Here, a bus is a subsystem that transfers data between components inside a computer or between computers, for example.

In a configuration in which not only a legal operator but also a large number of unspecified third parties can connect a tool (operation device) to the bus, however, it is conceivable that a malicious third party may connect an illegal tool to the bus to perform an illegal operation such as illegally reading data from an ECU connected to the bus or illegally rewriting a control program for an ECU connected to the bus. Under such circumstances, it is desired to take defensive measures against connection of an illegal tool to the bus.

[Patent Document 1] JP-A-2007-166302 corresponding to US 2007/0133578

SUMMARY

It is an object of the present disclosure to provide a bus monitoring security device and a bus monitoring security system that can suppress damage due to connection of an illegal tool to a bus even if such an illegal tool is connected to the bus.

According to a first aspect of the present disclosure, a bus monitoring security device is connected to a bus, which includes a tool side bus having a tool connection terminal and an ECU side bus. The ECU side bus is coupled with an ECU, and the tool side bus is coupled with a tool capable of communicating with the ECU via the tool connection terminal. The tool side bus and the ECU side bus are separately coupled with the bus monitoring security device. The bus monitoring security device includes: a controller for determining whether the tool being to access the ECU is connected to the ECU side bus, and for restricting transmission and reception of data between the tool and the ECU when the controller determines that the tool is connected to the ECU side bus.

In the above device, even if a malicious third party connects a tool to the ECU-side bus, the bus monitoring security device determines the tool connected to the ECU-side bus as an illegal tool, and blocks transmission and reception of data between the illegal tool connected to the ECU-side bus and the ECU being accessed. Thus, damage due to connection of the illegal tool can be suppressed. The term "ECU being accessed" means that communication with the ECU is attempted for the purpose of various illegal operations such as illegally reading data from the ECU and illegally rewriting a control program for the ECU.

According to a second aspect of the present disclosure, a bus monitoring security system includes: the bus monitoring security device according to the first aspect of the present disclosure; and a deputy monitoring device for determining whether the bus monitoring security device is disconnected from the bus. When the deputy monitoring device determines that the bus monitoring security device is disconnected from the bus, the deputy monitoring device restricts transmission and reception of data between the tool and the ECU as an access object.

In the above system, it is assumed that a malicious third party may disconnect the bus monitoring security device from the bus and then connect a tool to the bus, rather than simply connecting a tool to the bus. With this configuration, however, even if a malicious third party disconnects the bus monitoring security device from the bus and then connects a tool to the bus, the deputy monitoring device blocks transmission and reception of data between the tool and the ECU being accessed in place of the bus monitoring security device. Thus, damage due to connection of the tool can be suppressed.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (First Embodiment)

Figure 1:
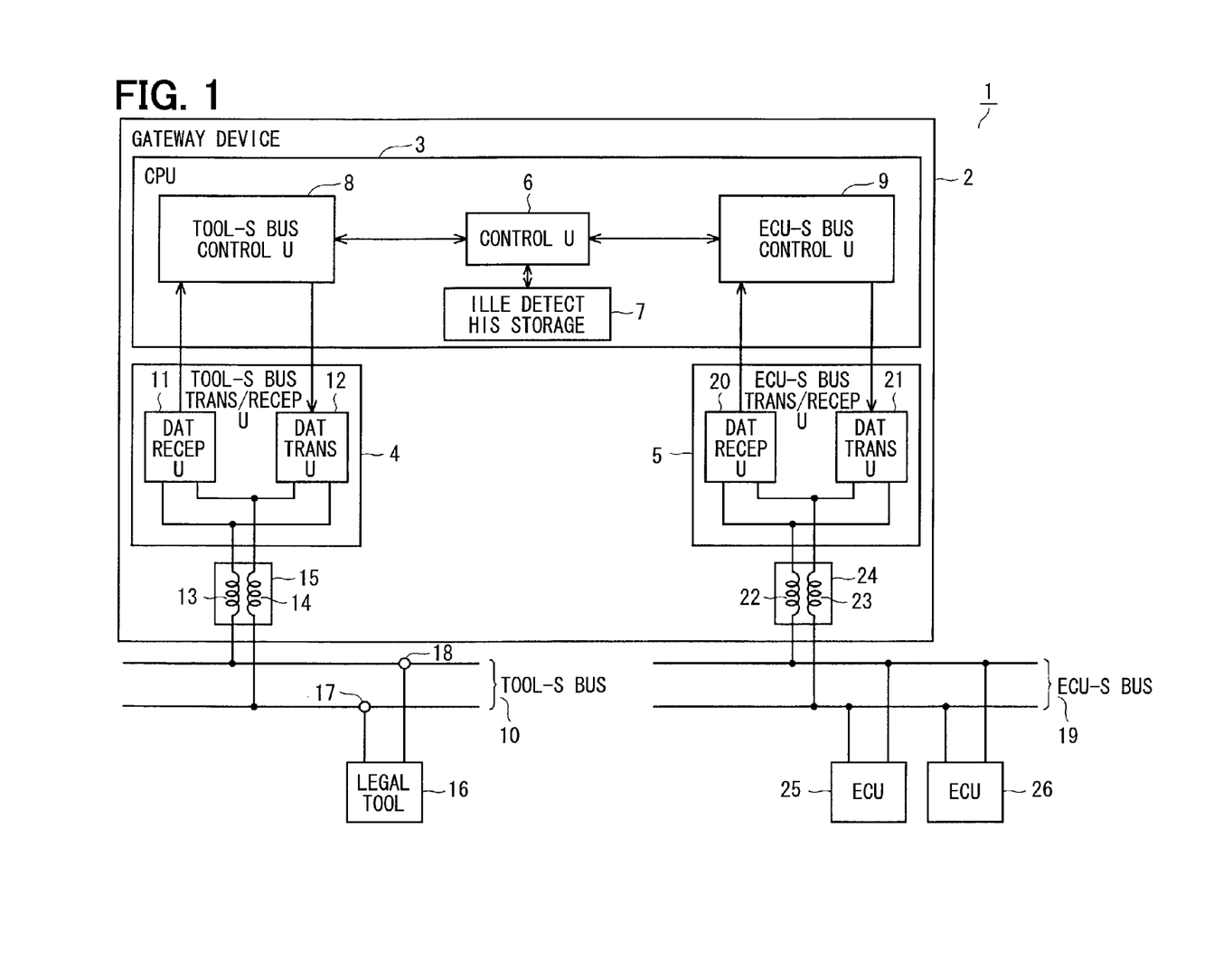
FIG. 1 is a functional block diagram showing a bus monitoring security system according to a first embodiment.

A first embodiment of the present disclosure will be described below with reference to FIGS. 1 to 6. FIG. 1 schematically shows the overall configuration of a bus monitoring security system. In a bus monitoring security system 1, a gateway device 2 (which functions as the bus monitoring security device) includes a central processing unit (CPU) 3, a tool-side bus transmission/reception section 4, and an electronic control unit (ECU)-side bus transmission/reception section 5. The CPU 3 is formed by a microcomputer. The CPU 3 includes components implemented by the microcomputer executing a control program, namely a control section 6 (which functions as the control means), an illegality detection history storage section 7 (which functions as the illegality detection history storage means), a tool-side bus control section 8, and an ECU-side bus control section 9.

The control section 6 controls operation of the illegality detection history storage section 7, the tool-side bus control section 8, and the ECU-side bus control section 9. As discussed in detail later, the control section 6 determines whether or not an illegal tool that is to attack (access) an ECU is connected to an ECU-side bus. If it is determined that an illegal tool is connected to the ECU-side bus, the control section 6 blocks transmission and reception of data between the illegal tool and the ECU being attacked, and also causes the illegality detection history storage section 7 to store information related to connection of the illegal tool to the ECU-side bus as an illegality detection history. The term "ECU being attacked" used above means that communication with the ECU is attempted for the purpose of various illegal operations such as illegally reading data from the ECU and illegally rewriting a control program for the ECU.

The tool-side bus control section 8 controls operation of the tool-side bus transmission/reception section 4 to transmit and receive data. The tool-side bus transmission/reception section 4 functions as a communication interface with a tool-side bus 10. The tool-side bus transmission/reception section 4 includes a data reception section 11 that operates to receive data sent from the tool-side bus 10 to the CPU 3, and a data transmission section 12 that operates to transmit data from the CPU 3 to the tool-side bus 10. The data reception section 11 and the data transmission section 12 are connected to the tool-side bus 10 via a common-mode choke coil 15 including two choke coils 13 and 14 to transmit and receive data to and from the tool-side bus 10 via the common-mode choke coil 15.

The tool-side bus 10 is provided with connection terminals 17 and 18 such as connectors, for example. The connection terminals 17 and 18 allow a legal operator to connect (mount) a legal tool (legal operation device) 16 to the tool-side bus 10. The legal tool 16 is a device that legally reads data from an ECU connected to the ECU-side bus to be discussed later or that legally rewrites a control program for an ECU connected to the ECU-side bus. That is, a legal operator can connect the legal tool 16 to the connection terminals 17 and 18 and operate the legal tool 16 to legally read data from an ECU as a data reading target or legally rewrite a control program for an ECU as a control program rewriting target.

The ECU-side bus control section 9 controls operation of the ECU-side bus transmission/reception section 5 to transmit and receive data. The ECU-side bus transmission/reception section 5 functions as a communication interface with an ECU-side bus 19. The ECU-side bus transmission/reception section 5 includes a data reception section 20 that operates to receive data sent from the ECU-side bus 19 to the CPU 3, and a data transmission section 21 that operates to transmit data from the CPU 3 to the ECU-side bus 19. The data reception section 20 and the data transmission section 21 are connected to the ECU-side bus 19 via a common-mode choke coil 24 including two choke coils 22 and 23 to transmit and receive data to and from the ECU-side bus 19 via the common-mode choke coil 24.

A plurality of ECUs 25 and 26 are connected to the ECU-side bus 19. The ECUs 25 and 26 are well-known ECUs such as an engine ECU that controls operation of an engine, a door lock ECU that controls operation of a door lock mechanism, and a navigation ECU that controls operation of a navigation system. The number of ECUs connected to the ECU-side bus 19 may be three or more, or may be only one.

As described above, the gateway device 2 includes the tool-side bus transmission/reception section 4 including a communication interface with the tool-side bus 10 and the ECU-side bus transmission/reception section 5 including a communication interface with the ECU-side bus 19. The gateway device 2 is connected to the tool-side bus 10 and the ECU-side bus 19 so as to separate (divide) the tool-side bus 10, to which the legal tool 16 can be connected by a legal operator, and the ECU-side bus 19, to which the ECUs 25 and 26 are connected, from each other.

In the configuration described above, if the legal tool 16 is connected to the tool-side bus 10 and the ECU 25 is the data reading target or the control program rewriting target, for example, data output from the legal tool 16 (data such as a data request command or a rewriting program) are input to the ECU 25 via the tool-side bus 10, the common-mode choke coil 15, the data reception section 11 of the tool-side bus transmission/reception section 4, the tool-side bus control section 8, the control section 6, the ECU-side bus control section 9, the data transmission section 21 of the ECU-side bus transmission/reception section 5, the common-mode choke coil 24, and the ECU-side bus 19. Meanwhile, data output from the ECU 25 (data such as a data response command or the results of program rewriting) are input to the legal tool 16 via the ECU-side bus 19, the common-mode choke coil 24, the data reception section 20 of the ECU-side bus transmission/reception section 5, the ECU-side bus control section 9, the control section 6, the tool-side bus control section 8, the data transmission section 12 of the tool-side bus transmission/reception section 4, the common-mode choke coil 15, and the tool-side bus 10.

Figure 2:
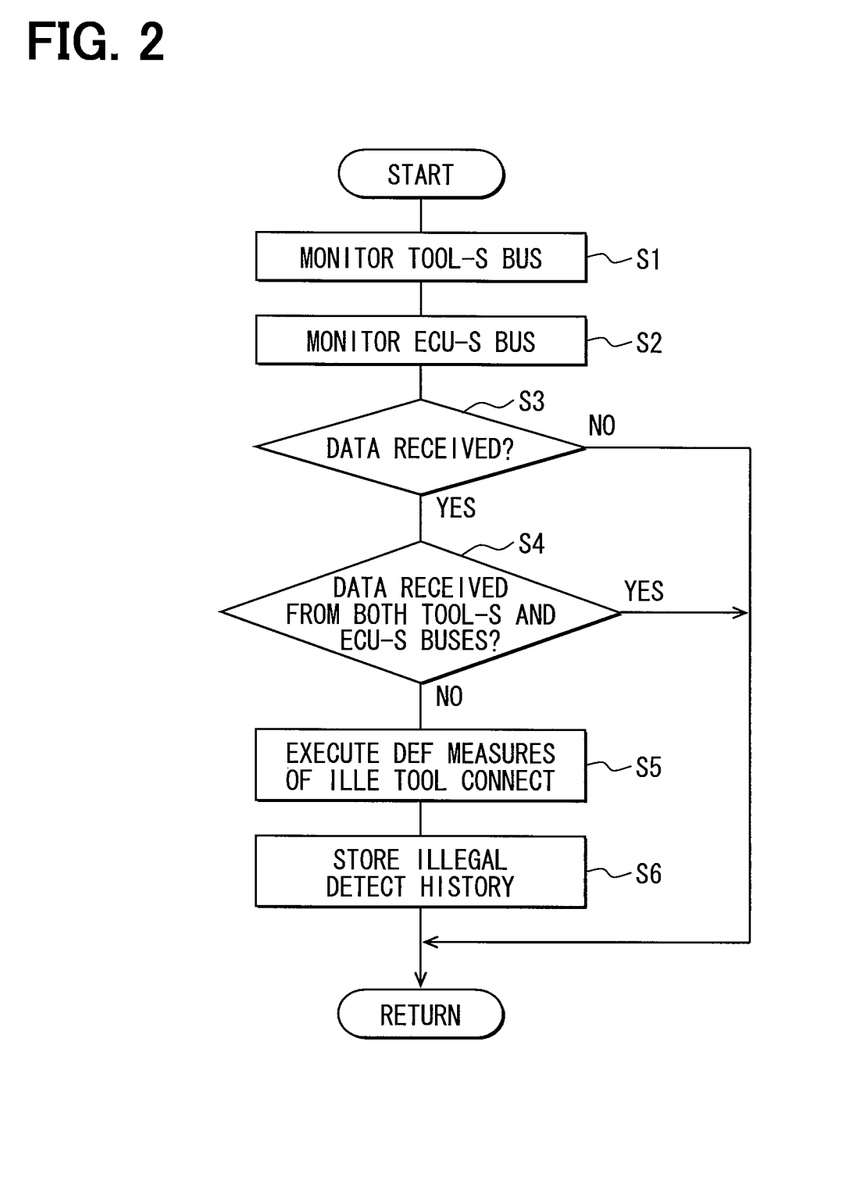
FIG. 2 is a flowchart showing a process performed by a gateway device.

Next, the effect of the configuration described above will be described with reference to FIGS. 2 to 6. FIG. 2 is a flowchart showing a process performed by the CPU 3 of the gateway device 2.

When a bus monitoring process is started, the CPU 3 monitors transmission and reception of data between the tool-side bus control section 8 and the tool-side bus transmission/reception section 4 to monitor the tool-side bus 10 (step S1). The CPU 3 also monitors transmission and reception of data between the ECU-side bus control section 9 and the ECU-side bus transmission/reception section 5 to monitor the ECU-side bus 19 (step S2). If it is determined that data sent from the tool-side bus 10 to the tool-side bus control section 8 are received, or if it is determined that data sent from the ECU-side bus 19 to the ECU-side bus control section 9 are received ("YES" in step S3), the CPU 3 determines whether or not data are received from both the tool-side bus 10 and the ECU-side bus 19 (step S4).

When a legal operator connects the legal tool 16 to the tool-side bus 10, data output from the legal tool 16 are input to the control section 6 via the tool-side bus control section 8 and also data output from the ECUs 25 and 26 are input to the control section 6 via the ECU-side bus control section 9 as described above. Thus, data are received from both the tool-side bus 10 and the ECU-side bus 19. That is, if it is determined that data are received from both the tool-side bus 10 and the ECU-side bus 19 ("YES" in step S4), the CPU 3 determines that the legal tool 16 is connected to the tool-side bus 10, and terminates the bus monitoring process to be returned.

Figure 3:
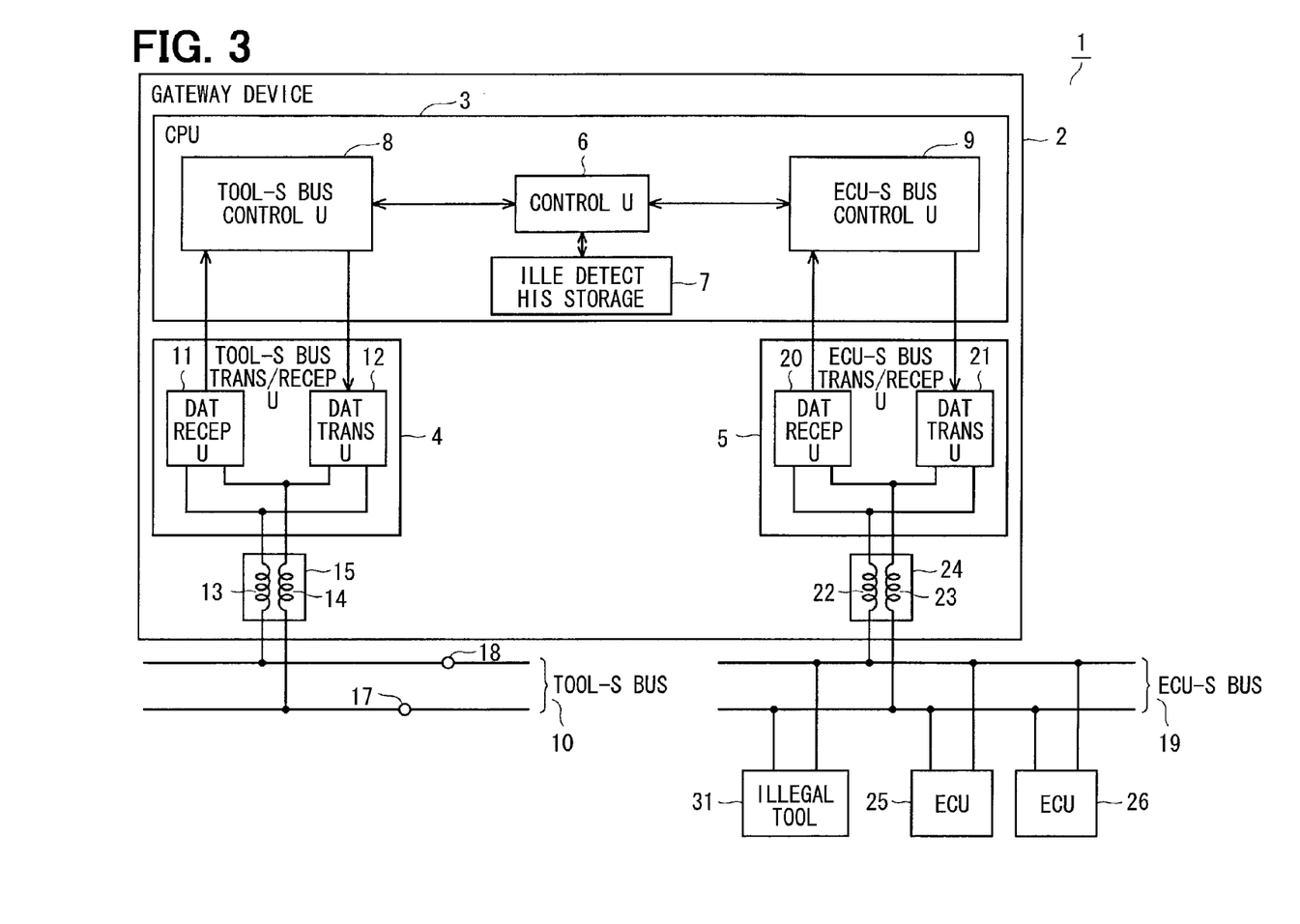
FIG. 3 is a diagram showing an example in which an illegal tool is connected to an ECU-side bus.

On the contrary, it is assumed that a malicious third party connects an illegal tool (illegal operation device) 31 to the ECU-side bus 19 as shown in FIG. 3. When a malicious third party connects the illegal tool 31 to the ECU-side bus 19, data output from the illegal tool 31 (data such as an illegal data request command or an illegal rewriting program) are input to the ECU being attacked via the ECU-side bus 19, and also input to the control section 6 via the common-mode choke coil 24, the data reception section 20 of the ECU-side bus transmission/reception section 5, and the ECU-side bus control section 9.

In this case, data output from the illegal tool 31 are input to the control section 6 via the ECU-side bus control section 9. Unlike the case where the legal tool 16 is connected to the tool-side bus 10, however, no data are output from the legal tool 16. Thus, no data are received from the tool-side bus 10, and data are only received from the ECU-side bus 19. That is, if it is determined that data are received from only one (ECU-side bus 19) of the tool-side bus 10 and the ECU-side bus 19 ("NO" in step S4), the CPU 3 determines that the illegal tool 31 is connected to the ECU-side bus 19. In other words, by determining that data are received from only one (ECU-side bus 19) of the tool-side bus 10 and the ECU-side bus 19, the CPU 3 determines that the tool connected to the bus is an illegal tool 31, and that the illegal tool 31 is connected to the ECU-side bus 19. Then, the CPU 3 takes defensive measures against connection of the illegal tool 31 to the ECU-side bus 19 (step S5).

The defensive measures against connection of the illegal tool 31 to the ECU-side bus 19 include the following three methods:

(1) a method of switching the ECU being attacked from an activation mode into a hibernation mode;

(2) a method of transmitting a pseudo data response command to the illegal tool 31; and (3) a method of transmitting to the ECU being attacked data in a data format different from the data format specified in accordance with the specifications.

The three methods will be sequentially described below.

(1) Method of Switching ECU being Attacked from Activation Mode into Hibernation Mode The ECUs 25 and 26 are configured to establish communication by transmitting a data response command to the outside within a predetermined time after reception of a data request command from the outside in the activation mode (wake-up mode). The ECUs 25 and 26 are also configured not to transmit a data response command to the outside within a predetermined time in the case where the ECUs 25 and 26 are switched from the activation mode into the hibernation mode (sleep mode) after reception of a data request command from the outside. In this method, the CPU 3 utilizes the operating characteristics of the ECUs 25 and 26 described above, and blocks transmission and reception of data (not to allow transmission and reception of data) between the illegal tool 31 and the ECU being attacked by switching the ECU being attacked from the activation mode into the hibernation mode. That is, if the ECU being attacked is switched from the activation mode into the hibernation mode, the ECU being attacked no longer transmits a data response command. Even if the ECU being attacked is switched (resumed) from the hibernation mode into the activation mode and transmits a data response command, the data request command transmitted to the ECU has been rendered unestablished (invalidated) if a predetermined time or more has elapsed since reception of the data request command. Thus, no data are transmitted or received between the illegal tool 31 and the ECU being attacked.

(2) Method of Transmitting Pseudo Data Response Command to Illegal Tool 31

Figure 4:
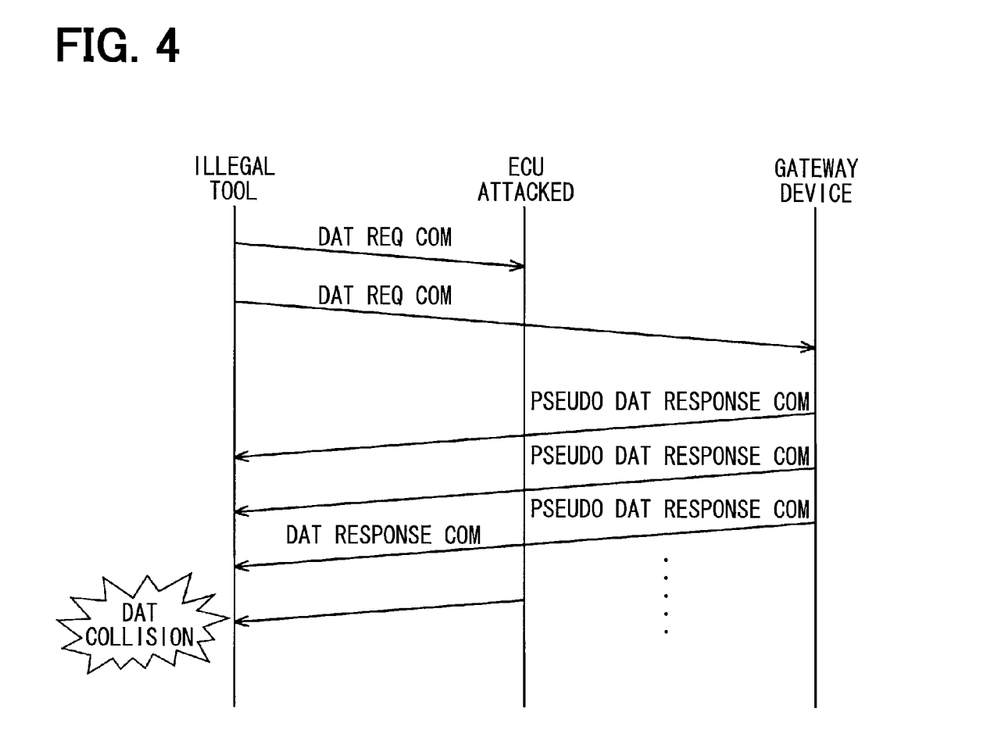
FIG. 4 is a diagram showing an example in which the gateway device transmits a pseudo data response command.

In this method, as shown in FIG. 4, the CPU 3 transmits a pseudo data response command to the illegal tool 31 using an identifier (ID) used by the ECU being attacked to transmit a data response command to the illegal tool 31 in response to receiving a data request command from the illegal tool 31. By the gateway device 2 transmitting a pseudo data response command to the illegal tool 31, even if the ECU being attacked transmits a data response command to the illegal tool 31, collision of data is caused between the pseudo data response command from the gateway device 2 and the data response command from the ECU being attacked. Thus, also in this case, no data are transmitted or received between the illegal tool 31 and the ECU being attacked.

(3) Method of Transmitting to ECU being Attacked Data in Data Format Different from Data Format Specified in Accordance with Specifications This method utilizes a function of the ECUs 25 and 26 to perform error determination in accordance with the specifications. In this method, data in a data format different from the data format specified in accordance with the specifications are transmitted to the ECU being attacked. By the gateway device 2 transmitting to the ECU being attacked data in a data format different from the data format specified in accordance with the specifications, the ECU being attacked performs error determination, and detects a communication error. Thus, also in this case, no data are transmitted or received between the illegal tool 31 and the ECU being attacked.

The CPU 3 may select and perform any of the three methods described above in accordance with the settings made by a vehicle manufacturer, in accordance with the type of the ECU being attacked, or in accordance with the type of the data request command from the illegal tool 31, for example. That is, if the ECU being attacked does not have a function of being switched from the activation mode into the hibernation mode, for example, the method (2) or (3) may be selected to be performed. If the ECU being attacked does not have a function of performing error determination, the method (1) or (2) may be selected to be performed.

After defensive measures are taken against connection of the illegal tool 31 to the ECU-side bus 19, the CPU 3 causes the illegality detection history storage section 7 to store information related to the connection of the illegal tool 31 to the ECU-side bus 19 (information such as the time when the illegal tool 31 is connected to the ECU-side bus 19 and the type of the ECU being accessed) as an illegality detection history (step S6). Then, the CPU 3 terminates the bus monitoring process to be returned. In the case where a legal operator connects the legal tool 16, for example, the CPU 3 may transmit the illegality detection history thus stored in the illegality detection history storage section 7 to the legal tool 16, an instrument panel, or a display device of the navigation system to inform the legal operator or the like of the illegality detection history.

Figure 5:
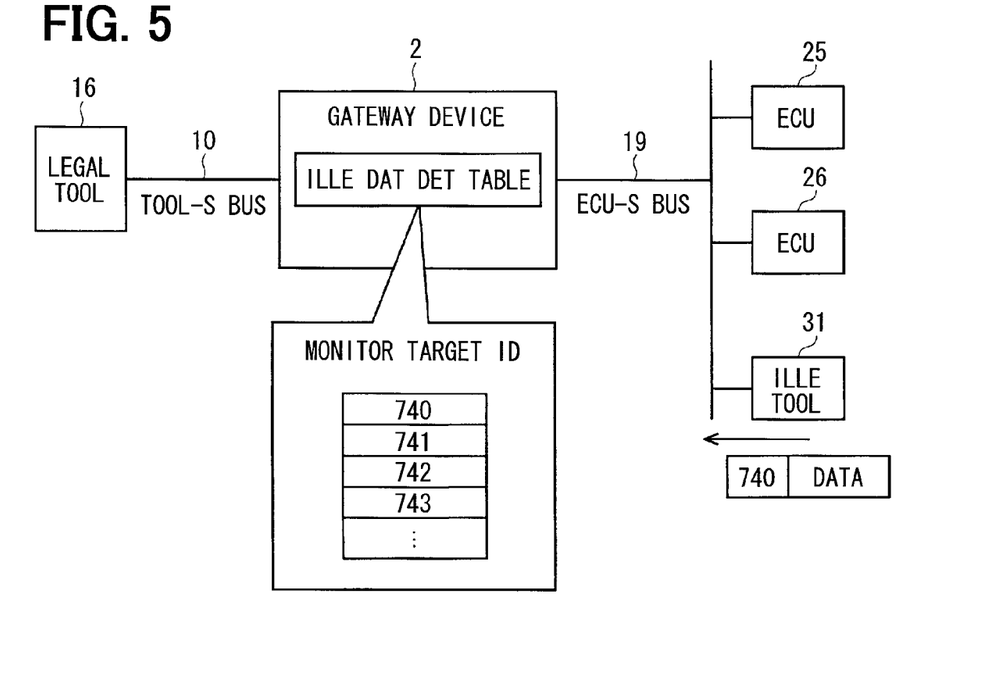
FIG. 5 is a diagram showing an example in which illegal data are determined.
Figure 6:
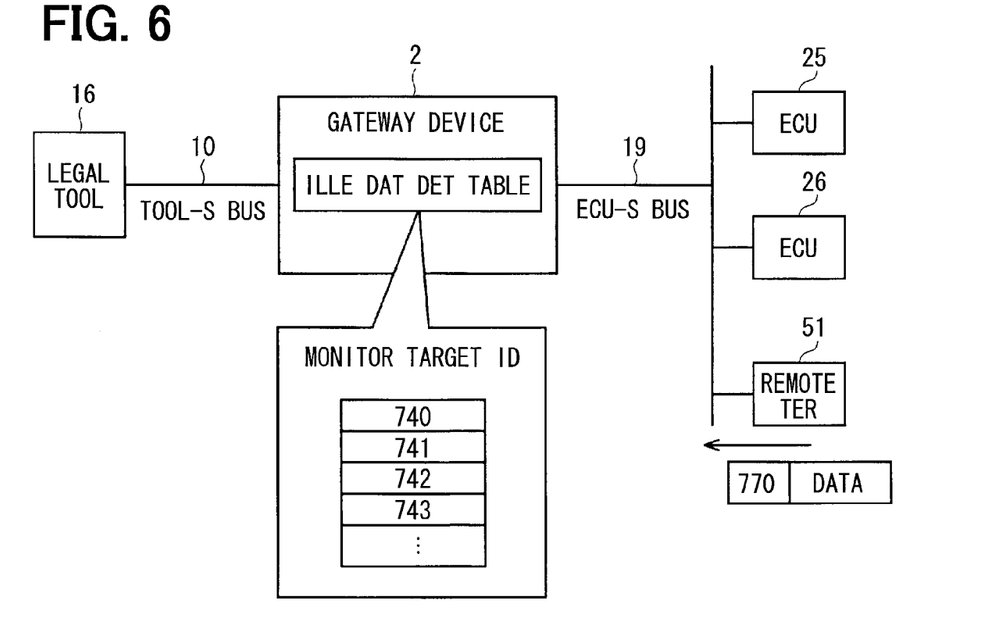
FIG. 6 is a diagram showing another example in which illegal data are determined.

In addition, as shown in FIGS. 5 and 6, the gateway device 2 may store in its storage area an illegal data determination table in which monitoring target IDs that may indicate illegal data are registered. When the illegal tool 31 is connected to the ECU-side bus 19 and data are transmitted from the illegal tool 31 as shown in FIG. 5, the CPU 3 verifies the ID ("740" in FIG. 5) of the data received from the illegal tool 31 against the monitoring target IDs registered in the illegal data determination table. If it is determined that the ID of the data received from the illegal tool 31 matches one of the monitoring target IDs, the CPU 3 determines that the data received from the illegal tool 31 are illegal data.

Meanwhile, a remote terminal 51 may be connected to the ECU-side bus 19 as shown in FIG. 6. When data are transmitted from the remote terminal 51, the CPU 3 verifies the ID ("770" in FIG. 6) of the data received from the remote terminal 51 against the monitoring target IDs registered in the illegal data determination table. If it is determined that the ID of the data received from the remote terminal 51 matches none of the monitoring target IDs, the CPU 3 determines that the data received from the remote terminal 51 are not illegal data (are legal data).

According to the first embodiment, as has been described above, the gateway device 2 is connected to the tool-side bus 10 and the ECU-side bus 19 so as to separate the tool-side bus 10, to which the legal tool 16 can be connected by a legal operator, and the ECU-side bus 19, to which the ECUs 25 and 26 are connected, from each other. In the gateway device 2, if it is determined that the illegal tool 31 which is to attack an ECU is connected to the ECU-side bus 19, transmission and reception of data between the illegal tool 31 and the ECU being attacked is blocked by switching the ECU being attacked from the activation mode into the hibernation mode, transmitting a pseudo data response command to the illegal tool 31, or transmitting to the ECU being attacked data in a data format different from the data format specified in accordance with the specifications. Thus, damage due to connection of the illegal tool 31 can be suppressed.

(Second Embodiment)

Next, a second embodiment of the present disclosure will be described with reference to FIGS. 7 to 10. Portions of the second embodiment that are the same as those of the first embodiment described above will not be described, and differences between the first and second embodiments will be described. In the second embodiment, it is considered that the gateway device 2 may be disconnected from the tool-side bus 10 and the ECU-side bus 19. The gateway device is provided with a deputy monitoring device that blocks transmission and reception of data between the illegal tool 31 and the ECU being attacked in place of the gateway device 2 in the case where the gateway device 2 is disconnected.

Figure 7:
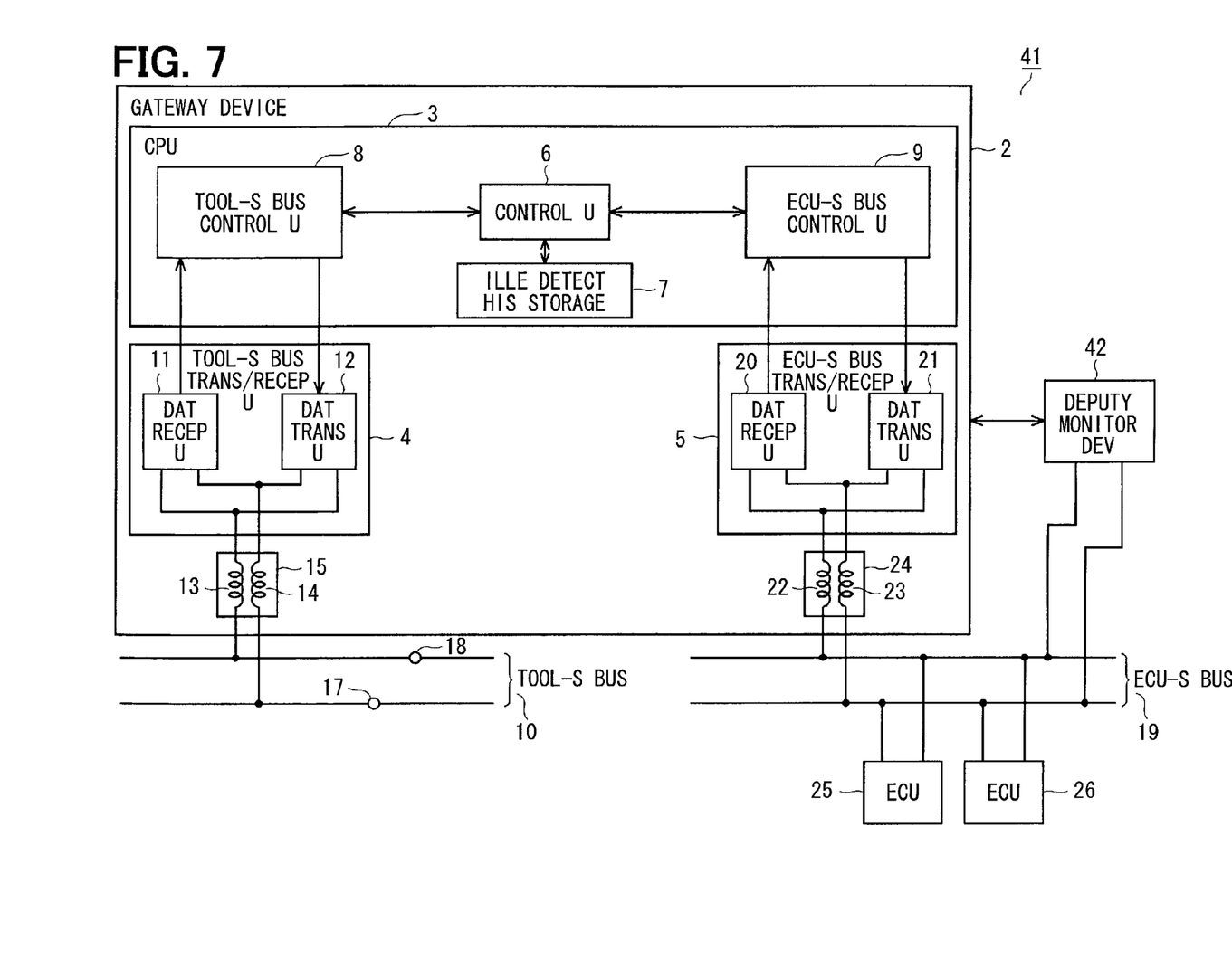
FIG. 7 is a functional block diagram showing a bus monitoring security system according to a second embodiment.

That is, in a bus monitoring security system 41, a deputy monitoring device 42 is connected to the gateway device 2. The deputy monitoring device 42 is connected to the ECU-side bus 19. When the gateway device 2 is connected to the tool-side bus 10 and the ECU-side bus 19, the gateway device 2 regularly outputs a connection maintenance signal to the deputy monitoring device 42. The deputy monitoring device 42 has a function of determining whether or not the gateway device 2 is connected to the tool-side bus 10 and the ECU-side bus 19 by determining whether or not the connection maintenance signal output from the gateway device 2 is input.

Figure 8:
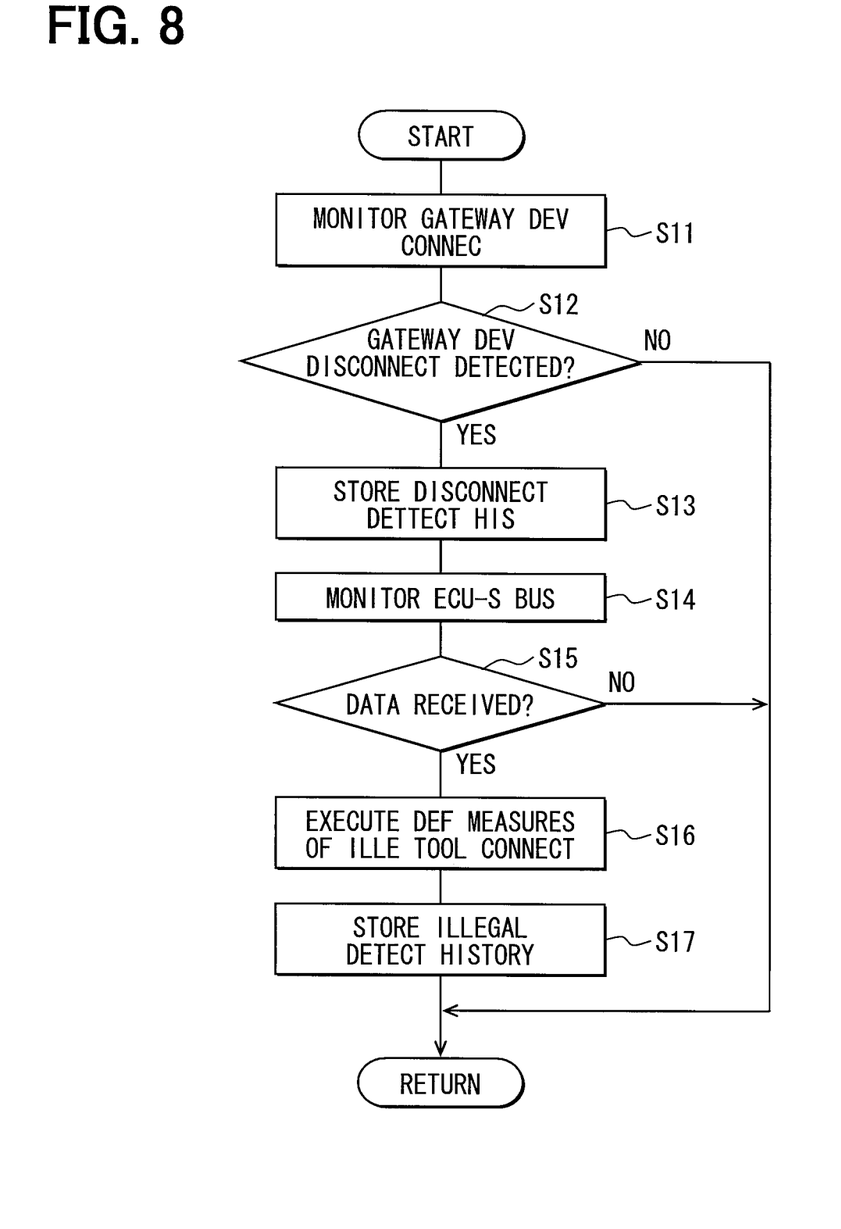
FIG. 8 is a flowchart showing a process performed by a deputy monitoring device.

Next, the effect of the configuration described above will be described with reference to FIGS. 8 to 10. FIG. 8 is a flowchart showing a process performed by the deputy monitoring device 42.

When a bus monitoring process is started, the deputy monitoring device 42 monitors whether or not a connection maintenance signal output from the gateway device 2 is input to monitor whether or not the gateway device 2 is connected to the tool-side bus 10 and the ECU-side bus 19 (step S11). If it is determined that a connection maintenance signal output from the gateway device 2 is input, the deputy monitoring device 42 determines that the gateway device 2 is connected (not disconnected from the tool-side bus 10 and the ECU-side bus 19) ("NO" in step S12). Then, the deputy monitoring device 42 terminates the bus monitoring process to be returned.

Figure 9:
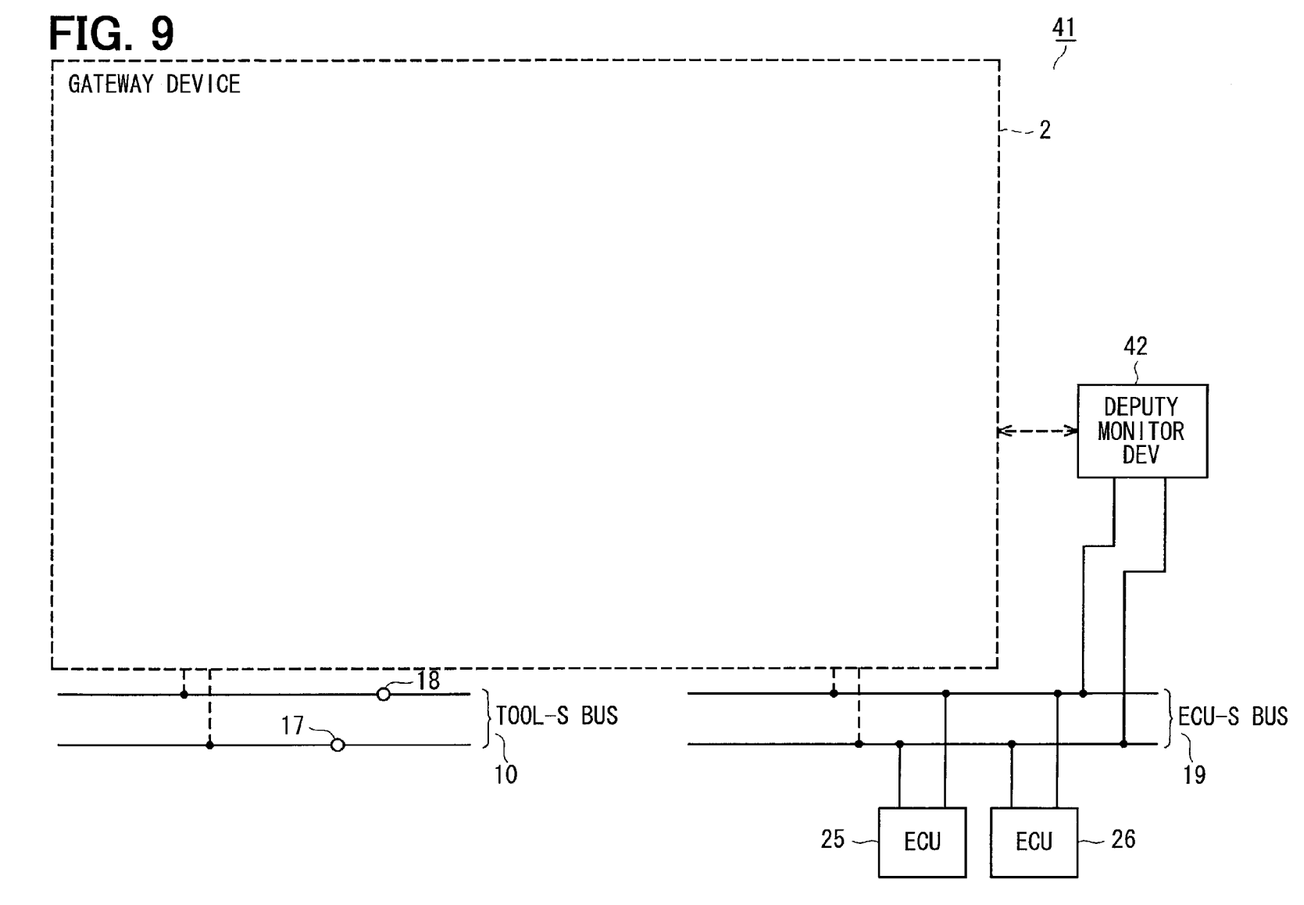
FIG. 9 is a diagram showing an example in which the gateway device has been disconnected.

On the contrary, it is assumed that a malicious third party disconnects the gateway device 2 from the tool-side bus 10 and the ECU-side bus 19 as shown in FIG. 9. If a malicious third party disconnects the gateway device 2 from the tool-side bus 10 and the ECU-side bus 19, the defensive measures, which are taken by the gateway device 2 and described in the first embodiment, cannot be taken.

In this case, if it is determined that a connection maintenance signal regularly output from the gateway device 2 is not regularly input because of disconnection of the gateway device 2 which regularly outputs the connection maintenance signal, the deputy monitoring device 42 determines that the gateway device 2 is disconnected from the tool-side bus 10 and the ECU-side bus 19 ("YES" in step S12), and stores information related to the disconnection of the gateway device 2 from the tool-side bus 10 and the ECU-side bus 19 (information such as the time when the gateway device 2 is disconnected) as a disconnection detection history (step S13). Then, the deputy monitoring device 42 monitors the ECU-side bus 19 (step S14).

Figure 10:
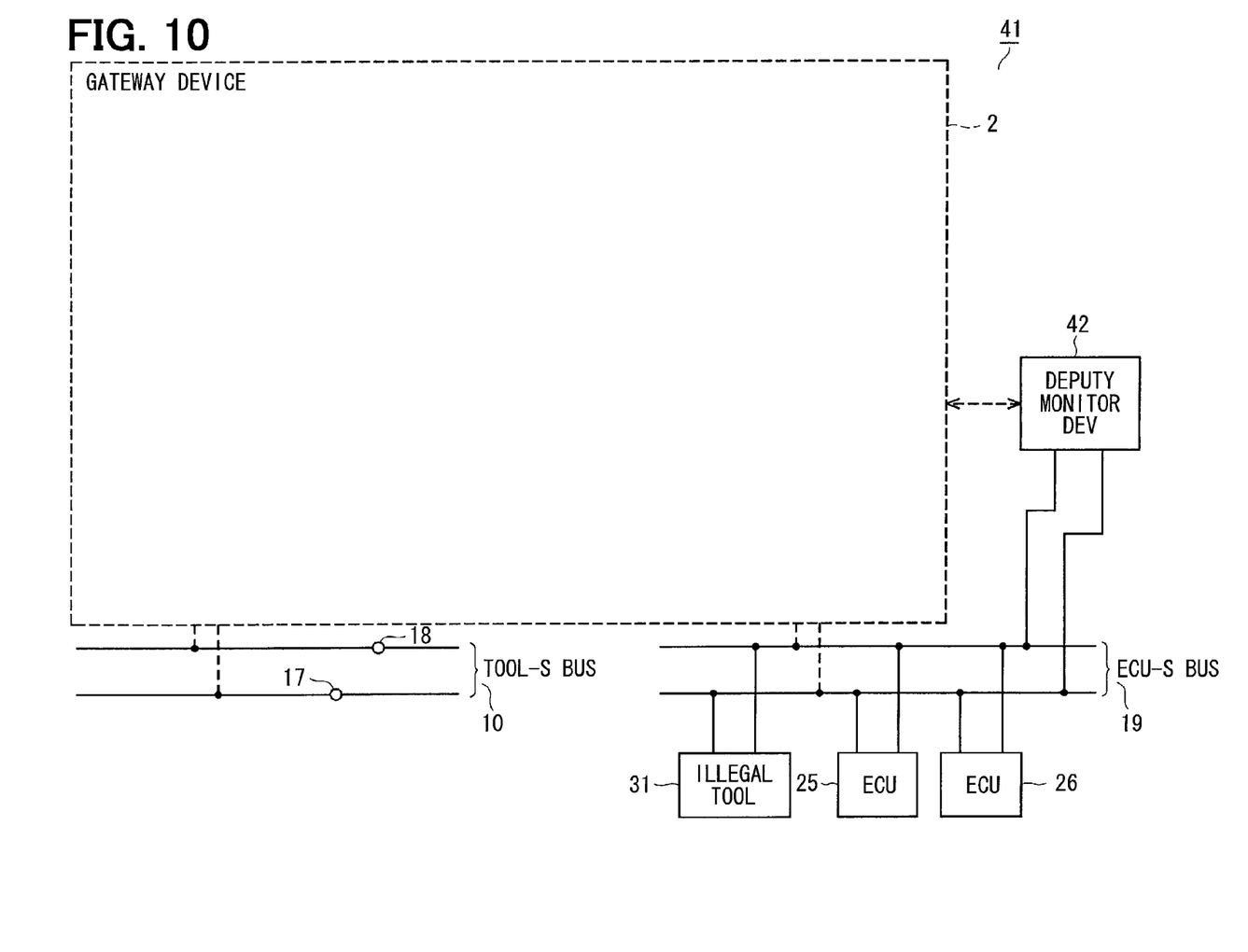
FIG. 10 is a diagram showing another example in which an illegal tool is connected to an ECU-side bus.

It is assumed that a malicious third party disconnects the gateway device 2 from the tool-side bus 10 and the ECU-side bus 19 and then connects the illegal tool 31 to the ECU-side bus 19 as shown in FIG. 10. When a malicious third party connects the illegal tool 31 to the ECU-side bus 19, data output from the illegal tool 31 (data such as an illegal data request command or an illegal rewriting program) are input to the ECU being attacked via the ECU-side bus 19, and also input to the deputy monitoring device 42.

If it is determined that data are received from the ECU-side bus 19 ("YES" in step S15), the deputy monitoring device 42 determines that the illegal tool 31 is connected to the ECU-side bus 19, and takes defensive measures against connection of the illegal tool 31 to the ECU-side bus 19 (step S16). That is, the deputy monitoring device 42 takes defensive measures as with the gateway device 2 which takes one of the defensive measures (1) to (3) as described in the first embodiment.

Also in this case, after defensive measures are taken against connection of the illegal tool 31 to the ECU-side bus 19, the deputy monitoring device 42 stores information related to the connection of the illegal tool 31 to the ECU-side bus 19 (information such as the time when the illegal tool 31 is connected to the ECU-side bus 19 and the type of the ECU being accessed) as an illegality detection history (step S17). Then, the deputy monitoring device 42 terminates the bus monitoring process to be returned. In the case where a legal operator connects the legal tool 16, for example, the deputy monitoring device 42 may transmit the thus stored illegality detection history to the legal tool 16, an instrument panel, or a display device of the navigation system to inform the legal operator or the like of the illegality detection history.

According to the second embodiment, as has been described above, if it is determined that the gateway device 2 is disconnected from the tool-side bus 10 and the ECU-side bus 19 and it is determined that the illegal tool 31 which is to attack an ECU is connected to the ECU-side bus 19, the deputy monitoring device 42 connected to the gateway device 2 blocks transmission and reception of data between the illegal tool 31 and the ECU being attacked in place of the gateway device 2. Thus, damage due to connection of the illegal tool 31 can be suppressed even if the illegal tool 31 is connected after the gateway device 2 is disconnected from the tool-side bus 10 and the ECU-side bus 19.

(Other Embodiments)

The present disclosure is not limited to the embodiments described above, and the embodiments may be modified or expanded as follows.

In the configuration described above, the monitoring target IDs that may indicate illegal data are registered in the illegal data determination table. In other configurations, however, non-monitoring target IDs that may indicate non-illegal data (legal data) may be registered in an illegal data determination table. If it is determined that the ID of the data received from the remote terminal 51 matches one of the non-monitoring target IDs, it may be determined that the data received from the remote terminal 51 are not illegal data.

In the second embodiment, the deputy monitoring device 42 determines whether or not the gateway device 2 is connected to the tool-side bus 10 and the ECU-side bus 19 by determining whether or not a connection maintenance signal regularly output from the gateway device 2 is input. In other configurations, however, an acknowledgment request signal may be regularly output to the gateway device 2. It may be determined that the gateway device 2 is connected to the tool-side bus 10 and the ECU-side bus 19 by determining whether or not an acknowledgement response signal, which is a response to the acknowledgment request signal, is input from the gateway device 2.

The above disclosure has the following aspects.

According to a first aspect of the present disclosure, a bus monitoring security device is connected to a bus, which includes a tool side bus having a tool connection terminal and an ECU side bus. The ECU side bus is coupled with an ECU, and the tool side bus is coupled with a tool capable of communicating with the ECU via the tool connection terminal. The tool side bus and the ECU side bus are separately coupled with the bus monitoring security device. The bus monitoring security device includes: a controller for determining whether the tool being to access the ECU is connected to the ECU side bus, and for restricting transmission and reception of data between the tool and the ECU when the controller determines that the tool is connected to the ECU side bus.

In the above device, even if a malicious third party connects a tool to the ECU-side bus, the bus monitoring security device determines the tool connected to the ECU-side bus as an illegal tool, and blocks transmission and reception of data between the illegal tool connected to the ECU-side bus and the ECU being accessed. Thus, damage due to connection of the illegal tool can be suppressed. The term "ECU being accessed" means that communication with the ECU is attempted for the purpose of various illegal operations such as illegally reading data from the ECU and illegally rewriting a control program for the ECU.

Alternatively, the controller may not restrict transmission and reception of data between the tool and the ECU when the controller determines that the tool is connected to the tool side bus.

Alternatively, the controller may determine whether the tool being to access the ECU is directly connected to the ECU side bus, and restrict transmission and reception of data between the tool and the ECU when the controller determines that the tool is directly connected to the ECU side bus.

Alternatively, when the ECU is in an activation mode, the ECU may establish communication in such a manner that the ECU transmits a data response command to an external device within a predetermined time after the ECU receives a data request command from the external device. When the controller switches from the activation mode to a sleep mode after the ECU receives the data request command from the external device, the ECU does not transmit the data response command to the external device within the predetermined time. When the controller determines that the tool being to access the ECU is connected to the ECU side bus, the controller controls the ECU as an access object to switch from the activation mode to the sleep mode so that the controller restricts transmission and reception of data between the tool and the ECU. In this case, transmission of a data response command within a predetermined time can be prevented by switching the ECU being accessed from the activation mode into the hibernation mode. Even if the ECU being attacked is switched (resumed) from the hibernation mode into the activation mode and transmits a data response command, the data request command transmitted to the ECU can be rendered unestablished (invalidated) if a predetermined time or more has elapsed since reception of a data request command. Thus, transmission and reception of data between the tool and the ECU being attacked can be blocked.

Alternatively, when the controller determines that the tool being to access the ECU is connected to the ECU side bus, the controller may transmit a pseudo data response command to the tool so that the controller restricts transmission and reception of data between the tool and the ECU. In this case, a pseudo data response command is transmitted to the tool to cause collision of data between the pseudo data response command sent to the tool and the data response command sent from the ECU being accessed to the tool. Thus, transmission and reception of data between the tool and the ECU being accessed can be blocked.

Alternatively, when the controller determines that the tool being to access the ECU is connected to the ECU side bus, the controller may transmit data having a data format different from a predetermined data format, which is defined in a specification of the bus so that the controller restricts transmission and reception of data between the tool and the ECU. In this case, data in a data format different from a data format specified in accordance with specifications are transmitted to the ECU being accessed to cause the ECU to perform error determination. Thus, transmission and reception of data between the tool and the ECU being accessed can be blocked.

Alternatively, the bus monitoring security device may further include: a storage element for storing an illegality detection history. When the controller determines that the tool being to access the ECU is connected to the ECU side bus, the controller controls the storage element to store the illegality detection history, which is information related to connection between the tool and the ECU side bus. In this case, information such as the time when the tool is connected to the ECU-side bus and the type of the ECU being accessed, for example, can be stored.

Further, the controller may provide notification of the illegality detection history stored in the storage element. In this case, information such as the time when the tool is connected to the ECU-side bus and the type of the ECU being accessed, for example, can be analyzed to obtain useful information or take defensive measures.

According to a second aspect of the present disclosure, a bus monitoring security system includes: the bus monitoring security device according to the first aspect of the present disclosure; and a deputy monitoring device for determining whether the bus monitoring security device is disconnected from the bus. When the deputy monitoring device determines that the bus monitoring security device is disconnected from the bus, the deputy monitoring device restricts transmission and reception of data between the tool and the ECU as an access object.

In the above system, it is assumed that a malicious third party may disconnect the bus monitoring security device from the bus and then connect a tool to the bus, rather than simply connecting a tool to the bus. With this configuration, however, even if a malicious third party disconnects the bus monitoring security device from the bus and then connects a tool to the bus, the deputy monitoring device blocks transmission and reception of data between the tool and the ECU being accessed in place of the bus monitoring security device. Thus, damage due to connection of the tool can be suppressed.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A bus monitoring security device connected to a bus, which includes a tool side bus having a tool connection terminal and an Electronic Control Unit (ECU) side bus, wherein the ECU side bus is coupled with the ECU, and the tool side bus is coupled with a legal operation tool capable of communicating with the ECU via the tool connection terminal, and wherein the tool side bus and the ECU side bus are separately coupled with the bus monitoring security device, the bus monitoring security device comprising:
    a controller determining whether an illegal operation tool accessing the ECU is connected to the ECU side bus, based on data reception from the ECU side bus and data reception from the tool side bus, and restricting transmission and reception of data between the illegal operation tool and the ECU when the controller detects that data is received from only the ECU side bus so that the controller determines that the illegal operation tool is connected to the ECU side bus,
    wherein the controller does not restrict transmission and reception of data between the legal o ration tool and the ECU when the controller determines that the fetal operation tool is connected to the tool side bus.

2. The bus monitoring security device according to claim 1, wherein the controller determines whether a tool accessing the ECU is directly connected to the ECU side bus, and restricts transmission and reception of data between the tool and the ECU when the controller determines that the tool is directly connected to the ECU side bus.

3. The bus monitoring security device according to claim 1, wherein, when the ECU is in an activation mode, the ECU establishes communication in such a manner that the ECU transmits a data response command to an external device within a predetermined time after the ECU receives a data request command from the external device,
    wherein, when the controller switches from the activation mode to a sleep mode after the ECU receives the data request command from the external device, the ECU does not transmit the data response command to the external device within the predetermined time, and
    wherein, when the controller determines that the illegal operation tool accessing the ECU is connected to the ECU side bus, the controller controls the ECU as an access object to switch from the activation mode to the sleep mode so that the controller restricts transmission and reception of data between the illegal operation tool and the ECU.

4. The bus monitoring security device according to claim 1, wherein, when the controller determines that the illegal operation tool accessing the ECU is connected to the ECU side bus, the controller transmits a pseudo data response command to the illegal operation tool so that the controller restricts transmission and reception of data between the illegal operation tool and the ECU.

5. The bus monitoring security device according to claim 1, wherein, when the controller determines that the illegal operation tool accessing the ECU is connected to the ECU side bus, the controller transmits data having a data format different from a predetermined data format, which is defined in a specification of the bus so that the controller restricts transmission and reception of data between the illegal operation tool and the ECU.

6. The bus monitoring security device according to claim 1, further comprising:
    a storage element storing an illegality detection history,
    wherein, when the controller determines that the illegal operation tool accessing the ECU is connected to the ECU side bus, the controller controls the storage element to store the illegality detection history, which is information related to connection between the illegal operation tool and the ECU side bus.

7. The bus monitoring security device according to claim 6, wherein the controller provides notification of the illegality detection history stored in the storage element.

8. A bus monitoring security system comprising:
    a bus monitoring security device connected to a bus, which includes a tool side bus having a tool connection terminal and an Electronic Control Unit (ECU) side bus, wherein the ECU side bus is coupled with the ECU, and the tool side bus is coupled with a legal operation tool capable of communicating with the ECU via the tool connection terminal, and wherein the tool side bus and the ECU side bus are separately coupled with the bus monitoring security device, the bus monitoring security device comprising:
    a controller determining whether an illegal operation tool accessing the ECU is connected to the ECU side bus, based on data reception from the ECU side bus and data reception from the tool side bus, and restricting transmission and reception of data between the illegal operation tool and the ECU when the controller detects that data is received from only the ECU side bus so that the controller determines that the illegal operation tool is connected to the ECU side bus; and
    a deputy monitoring device determining whether the bus monitoring security device is disconnected from the bus,
    wherein, when the deputy monitoring device determines that the bus monitoring security device is disconnected from the bus, the deputy monitoring device restricts transmission and reception of data between the illegal operation tool and the ECU as an access object, and
    wherein the controller does not restrict transmission and reception of data between the legal operation tool and the ECU when the controller determines that the legal operation tool is connected to the tool side bus.

9. The bus monitoring security device according to claim 1, wherein the controller determines that the illegal operation tool is connected to the ECU side bus, the controller also determines that the illegal operation tool is not connected to the tool side bus.

* * * * *